H. P. GANDY.
FISHING DEVICE.
APPLICATION FILED SEPT. 4, 1915.
1,163,078.
Patented Dec. 7, 1915.
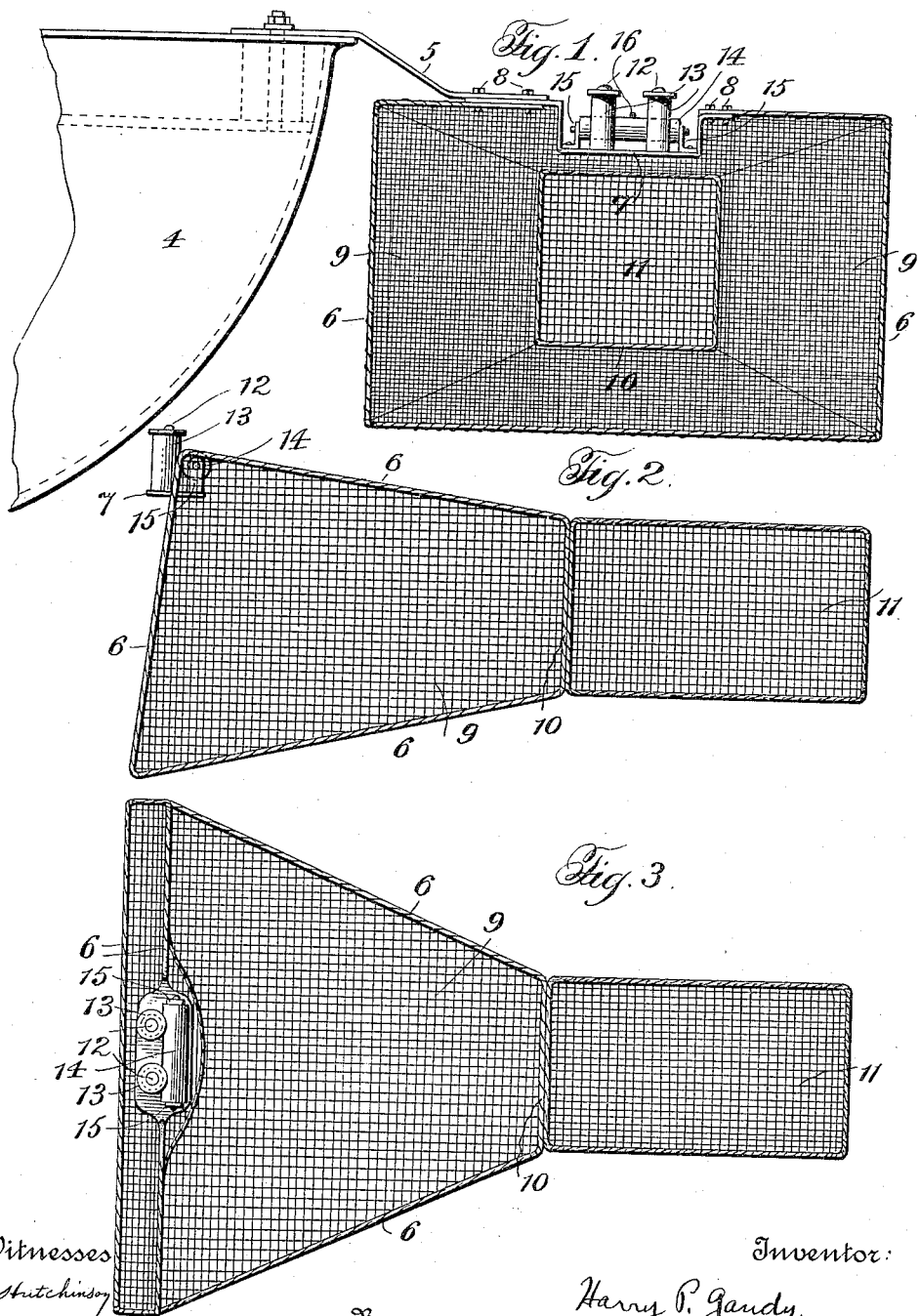

UNITED STATES PATENT OFFICE.

HARRY P. GANDY, OF HAMPTON, VIRGINIA, ASSIGNOR OF ONE-HALF TO RICHARD ARMSTRONG, OF HAMPTON, VIRGINIA.

FISHING DEVICE.

1,163,078.     Specification of Letters Patent.     Patented Dec. 7, 1915.

Application filed September 4, 1915. Serial No. 49,069.

*To all whom it may concern:*

Be it known that I, HARRY P. GANDY, a citizen of the United States, residing at Hampton, in the county of Elizabeth City and State of Virginia, have invented certain new and useful Improvements in Fishing Devices, of which the following is a specification, reference being had therein to the accompanying drawing.

This invention provides a device for expeditiously taking crabs and other crustacea from trot-lines.

The trot-line used for catching crabs usually is of considerable length, it is fastened and buoyed at each end, and it has bait fixed thereto at intervals lying on or close to the bottom that is grabbed and held by the crabs in their effort to consume it. In gathering crabs from a trot-line, it is the common practice for a fisherman in a small boat to raise the line at or near one end and to pull himself along the line to the other end, taking by a hand-net the crabs holding onto the bait as they come to or near to the surface of the water.

It is an object of this invention to provide a device adapted for installation on a motor-propelled boat and arranged, without stopping the boat, to raise a trot-line and to gather the crabs as they release their hold on the bait upon being brought to or near to the surface of the water as the boat proceeds along the line. Moreover, the device is so arranged that those crabs are caught that may release their hold of the bait on approaching the surface of the water but farther below than ordinarily can be reached by the hand-net commonly used. The invention avoids the slow process of taking crabs by a hand-net, and it results in the taking of many crabs that are lost in following the old method.

When read in connection with the description herein, the details of construction and arrangement of parts contemplated by the invention will be apparent from the accompanying drawing, forming part hereof, wherein an embodiment of the invention, as adapted to the taking of crabs, is disclosed, for purposes of illustration.

While the disclosures herein now are considered to represent a preferable embodiment of the invention, it is to be understood that it is not the intention to be limited necessarily thereto in interpretation of the claims, as changes within the limits of the claims can be made without departing from the nature and spirit of the invention.

Like reference-characters refer to corresponding parts in the views of the drawing, of which—

Figure 1 is a front view; Fig. 2 is a side view; and Fig. 3 is a top view.

Referring more particularly to the drawing, 4 designates a small boat or other suitable floating structure, and 5 an arm secured in any suitable manner thereto and extending laterally and downwardly from its gunwale and then substantially horizontally a short distance above the surface of the water, the arm supporting the device now to be described.

A frame 6, preferably rectangular in shape, and including in its upper portion a drop arm or plate 7, is secured to the arm 5 by any suitable fastenings 8, and to this frame is secured netting 9, which converges and is attached to a smaller frame 10 behind the frame 6. A runway or mouth thus is provided that leads into a net-bag 11 secured to frame 10, and the parts are adapted to trail in the water from arm 5 while the boat is in motion. Upright rods or bolts 12 are carried by the dropped portion of the arm or plate 7, and on them are journaled rollers 13. A substantially horizontal roller 14 is journaled near the rollers 13 on bearings 15 carried by the arm or plate 7. The rollers serve as guides for a trot-line 16.

When the device is in use, and the boat carrying it being in motion, the trot-line runs on the roller 14 and thereby is raised to the surface of the water, and the upright rollers 13 operate to keep the line in place when there is an inclination of the boat to diverge from the course of the line, as there may be in practice. As the bait at intervals along the line is brought to the surface, crabs holding thereon will release their hold before or upon reaching the line-guides, and in the water they are directed by the moving mouth of the device into the bag 11, where they are held until the bag is emptied, it being understood, of course, that the boat travels fast enough to prevent the crabs from swimming in the direction of motion of the boat out through the mouth.

It will be seen that by the use of this device crabs are taken from a trot-line more expeditiously than by the old method of drawing a boat along the line and stopping at every bait having a crab thereon to remove the crab by a hand-net, and that those crabs that release their hold in front of the mouth before reaching the surface are guided into the bag.

Having thus described my invention, what I claim as new, and desire to secure by Letters Patent, is—

1. A fishing device arranged to be moved through the water and comprising a frame, guide members arranged to raise and guide a trot-line, and netting carried by said frame and arranged to receive fish dropped from said line while the device is in motion.

2. A fishing device arranged to be moved through the water and comprising a frame, guide members on said frame arranged to raise and guide a trot-line, a mouth extending rearwardly from said frame arranged to receive fish dropped from said line while the device is in motion, and a bag into which said mouth leads.

3. The combination, with a floating structure, of a fishing device comprising a support carried by said structure, guide members on said support arranged to raise and guide a trot-line, and netting carried by said support and arranged to receive fish dropped from said line while the device is being moved through the water.

4. The combination, with a floating structure, of a fishing device comprising a support carried by said structure, a frame carried by said support, guide members on said frame arranged to raise and guide a trot-line, a mouth extending rearwardly from said frame and arranged to receive fish dropped from said line while the device is in motion, and a bag into which said mouth leads.

5. The combination, with a boat, of an arm extending laterally therefrom, guide members carried by said arm arranged to raise and guide a trot-line as the boat moves along the line, a frame carried by said arm, converging netting extending rearwardly from said frame and arranged to receive fish dropped from said trot-line while the device is in motion in the water, and a holding-bag into which said netting leads.

In testimony whereof, I affix my signature.

HARRY P. GANDY.

Copies of this patent may be obtained for five cents each, by addressing the "Commissioner of Patents, Washington, D. C."